US011530971B2

United States Patent
Xie et al.

(10) Patent No.: US 11,530,971 B2
(45) Date of Patent: Dec. 20, 2022

(54) DEVICE AND METHOD FOR MEASURING HORIZONTAL/VERTICAL PERMEABILITY OF HYDRATE RESERVOIR

(71) Applicant: Energy Research Institute of Jiangxi Academy of Sciences, Jiangxi (CN)

(72) Inventors: Yunsheng Xie, Jiangxi (CN); Jinming Shi, Jiangxi (CN); Min Lin, Jiangxi (CN); Min Fan, Jiangxi (CN); Wu Zou, Jiangxi (CN); Xianbin Ai, Jiangxi (CN); Jihai Xiong, Jiangxi (CN)

(73) Assignee: Energy Research Institute of Jiangxi Academy of Sciences, Jiangxi (CN)

(*) Notice: Subject to any disclaimer, the term of this patent is extended or adjusted under 35 U.S.C. 154(b) by 216 days.

(21) Appl. No.: 16/928,402

(22) Filed: Jul. 14, 2020

(65) Prior Publication Data
US 2021/0190666 A1  Jun. 24, 2021

(30) Foreign Application Priority Data

Dec. 24, 2019 (CN) .......................... 201911341574.4

(51) Int. Cl.
*G01N 15/08* (2006.01)
*G01N 33/00* (2006.01)
(52) U.S. Cl.
CPC ....... *G01N 15/082* (2013.01); *G01N 15/0806* (2013.01)

(58) Field of Classification Search
CPC ...... G01N 15/00; G01N 15/08; G01N 15/082; G01N 15/0806; G01N 33/00; G01N 33/24
See application file for complete search history.

(56) References Cited

FOREIGN PATENT DOCUMENTS

| CN | 108051354 A | * | 5/2018 | ......... G01N 15/0806 |
| CN | 109372499 A | * | 2/2019 | ............ E21B 49/00 |
| CN | 109557253 A | * | 4/2019 | ........... G01N 15/082 |

OTHER PUBLICATIONS

Energy 82 (2015) 686-696—Feb. 20, 2015; Bhade et al.*

* cited by examiner

*Primary Examiner* — Nguyen Q. Ha
(74) *Attorney, Agent, or Firm* — Browdy and Neimark, PLLC

(57) ABSTRACT

The present invention discloses a device and method for measuring a horizontal/vertical permeability of a hydrate reservoir. The device includes a cooling water/saturated methane water tank, a water injection pump, a methane gas tank, a booster pump, an air compressor, a high-pressure gas tank, a back pressure valve, a gas tank, a data acquisition instrument, a constant-temperature water bath and a hydrate reservoir horizontal/vertical permeability measuring apparatus provided in the constant-temperature water bath, where the cooling water/saturated methane water tank is provided with a water circulation inlet and an intake line at an upper part and a water circulation outlet at the bottom; the intake line is provided thereon with an intake control gate valve; the bottom of the cooling water/saturated methane water tank is in communication with the water injection pump.

7 Claims, 2 Drawing Sheets

DEVICE AND METHOD FOR MEASURING HORIZONTAL/VERTICAL PERMEABILITY OF HYDRATE RESERVOIR

TECHNICAL FIELD

The present invention relates to a device and method for measuring a horizontal/vertical permeability of a hydrate reservoir.

BACKGROUND

Natural gas hydrates (NGH) are widespread in nature, and methane hydrates are currently a potential strategic resource. Carbon dioxide is used to achieve the effective replacement of methane in hydrates in actual reservoirs. This method mines methane and makes full use of carbon dioxide in the atmosphere, which effectively reduces the greenhouse effect caused by carbon dioxide. Therefore, it is considered to be the most economical and environmentally friendly way to mine methane hydrates. During the injection of carbon dioxide, the horizontal/vertical permeability of the hydrate reservoir determines the gas flow performance in the reservoir, which has an important impact on the distribution of carbon dioxide in the reservoir. At present, there are many experimental devices for measuring the permeability of hydrate reservoirs, but none of them can measure the horizontal/vertical permeability. Therefore, it is impossible to further comprehensively understand the influence of hydrates on the permeability of the reservoir. In view of this, an experimental device for measuring the horizontal/vertical permeability of hydrate reservoirs is designed according to the needs of actual research.

SUMMARY

In order to overcome the shortcomings in the prior art, the present invention proposes a device and method for measuring a horizontal/vertical permeability of a hydrate reservoir.

A device for measuring a horizontal/vertical permeability of a hydrate reservoir includes a cooling water/saturated methane water tank, a water injection pump, a methane gas tank, a booster pump, an air compressor, a high-pressure gas tank, a back pressure valve, a gas tank, a data acquisition instrument, a constant-temperature water bath and a hydrate reservoir horizontal/vertical permeability measuring apparatus provided in the constant-temperature water bath, where the cooling water/saturated methane water tank is provided with a water circulation inlet and an intake line at an upper part and a water circulation outlet at the bottom; the intake line is provided thereon with an intake control gate valve; the bottom of the cooling water/saturated methane water tank is in communication with the water injection pump;

the methane gas tank and the air compressor are both in communication with the booster pump, and the booster pump is in communication with the high-pressure gas tank;

the water injection pump and the high-pressure gas tank are both in communication with an inlet of the hydrate reservoir horizontal/vertical permeability measuring apparatus; an outlet of the hydrate reservoir horizontal/vertical permeability measuring apparatus, the back pressure valve and the gas tank communicate in sequence; the gas tank is provided thereon with an exhaust line; the exhaust line is provided thereon with a gas flow meter;

the hydrate reservoir horizontal/vertical permeability measuring apparatus is provided thereon with a P1 horizontal differential pressure gauge, a P2 horizontal differential pressure gauge, a P3 horizontal differential pressure gauge, a P4 vertical differential pressure gauge, a P5 vertical differential pressure gauge and a P6 vertical differential pressure gauge;

the data acquisition instrument is electrically connected to the P1 horizontal differential pressure gauge, the P2 horizontal differential pressure gauge, the P3 horizontal differential pressure gauge, the P4 vertical differential pressure gauge, the P5 vertical differential pressure gauge, the P6 vertical differential pressure gauge and the gas flow meter;

the inlet of the hydrate reservoir horizontal/vertical permeability measuring apparatus includes a left inlet and a bottom inlet; the outlet of the hydrate reservoir horizontal/vertical permeability measuring apparatus includes a top outlet and a right outlet.

Further, the hydrate reservoir horizontal/vertical permeability measuring apparatus includes a reaction vessel, an inlet cover, an outlet cover, an inlet left clamp, an inlet right clamp, an outlet left clamp and an outlet right clamp; the inlet cover is fixed to an upper end of the reaction vessel through the inlet left clamp and the inlet right clamp; the outlet cove is fixed to a lower end of the reaction vessel through the outlet left clamp and the outlet right clamp.

Further, the intake line is further provided thereon with a pressure gauge.

Further, the gas tank is provided with a balance scale on the bottom.

Further, the cooling water/saturated methane water tank is provided therein with a bubbler.

Further, the high-pressure gas tank is provided thereon with a gas tank pressure gauge; the inlet of the hydrate reservoir horizontal/vertical permeability measuring apparatus is provided with a reactor inlet pressure gauge.

A method for measuring a horizontal/vertical permeability of a hydrate reservoir includes the following steps:

(1) loading a dried quantitative porous medium used for simulation into a hydrate reservoir horizontal/vertical permeability measuring apparatus;

(2) starting an air compressor and a booster pump to inject a gas into a high-pressure gas tank to a required gas pressure;

(3) injecting the gas into the hydrate reservoir horizontal/vertical permeability measuring apparatus to a certain pressure to check the tightness of the equipment to ensure that the equipment does not leak;

(4) adjusting the temperature of a constant-temperature water bath to a required temperature; opening a water circulation inlet and a water circulation outlet; starting an intake line, so that a gas enters a cooling water/saturated methane water tank through a bubbler and the methane gas dissolves in the water sufficiently to produce methane water; adjusting the temperature to the same temperature as the constant-temperature water bath;

(5) starting a water injection pump to inject water at a certain temperature into the hydrate reservoir horizontal/vertical permeability measuring apparatus and a related process; discharging the air in the porous medium and a pipeline; adjusting a back pressure valve to 5 MPa until a liquid in a gas tank has a constant flow rate and a liquid volume thereof is kept in balance with a discharge volume of the water injection pump;

(6) discharging the air from a P1 horizontal differential pressure gauge, a P2 horizontal differential pressure gauge, a P3 horizontal differential pressure gauge, a P4 vertical differential pressure gauge, a P5 vertical differential pressure gauge and a P6 vertical differential pressure gauge to ensure that the pipeline is filled with water;

(7) adjusting a reaction vessel to a certain pressure, and monitoring the data in real time by a reactor inlet pressure gauge, so as to keep a constant state;

(8) discharging a portion of the gas from the high-pressure container to displace water in the hydrate reservoir horizontal/vertical permeability measuring apparatus and provide space for the gas, and adjusting the reaction vessel to a certain pressure;

(9) starting the water injection pump to inject water into the hydrate reservoir horizontal/vertical permeability measuring apparatus to a certain pressure, and stopping the water injection pump;

(10) allowing a hydrate to be synthesized in the hydrate reservoir horizontal/vertical permeability measuring apparatus, and completing the hydrate formation after a period of time;

(11) adjusting the back pressure valve to a required pressure; starting the water injection pump to inject water into the hydrate reservoir horizontal/vertical permeability measuring apparatus at a constant speed until the flow rate of the gas tank remains constant; checking a gas flow meter to ensure that the hydrate is not decomposed, and obtaining a change in different differential pressures of a hydrate sample in a horizontal direction;

(12) after the test is completed, starting the water injection pump to inject water into the hydrate reservoir horizontal/vertical permeability measuring apparatus at the same speed as the horizontal permeability measurement process until the flow rate of the gas tank remains constant; checking the gas flow meter to ensure that the hydrate is not decomposed, and obtaining a change in different differential pressures of the hydrate sample in a vertical direction;

(13) recording the relevant data of the entire hydrate formation process and the testing process with a data acquisition instrument; and

(14) processing the relevant data based on Darcy's Law to obtain a change in the horizontal/vertical permeability.

The present invention has the following beneficial effects:

(1) The device realizes the measurement of the horizontal/vertical permeability under the same saturation through the design of a core container.

(2) The device is designed with different pressure outlets from different directions to obtain the pressure difference of different test sections, which is helpful to obtain the permeability at different locations to comprehensively study the effect of a hydrate on a porous medium.

(3) A new cooling water device is added to improve the testing process to ensure that the hydrate in the reservoir is not decomposed, which greatly reduces the decomposition of the hydrate during the test.

(4) An inlet and an outlet are connected by a clamp and matched with a rubber sealing ring to achieve effective sealing of a fluid and facilitate disassembly.

DETAILED DESCRIPTION

The present invention is further described below with reference to the examples and accompanying drawings.

Figure 1:
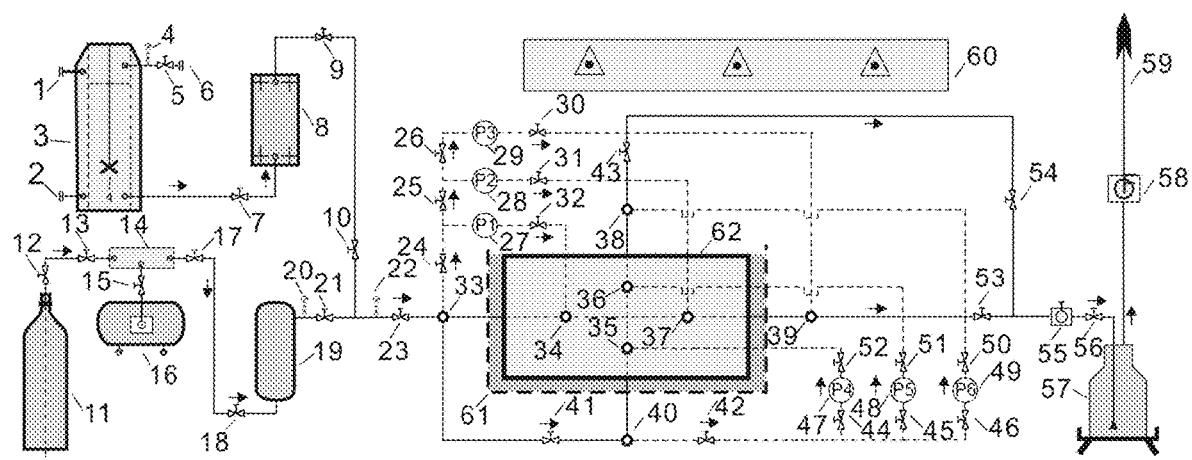
FIG. 1 is a structural diagram of the present invention.

As shown in FIG. 1, a device for measuring a horizontal/vertical permeability of a hydrate reservoir provided by the present invention includes a cooling water/saturated methane water tank 3, a water injection pump 8, a methane gas tank 11, a booster pump 14, an air compressor 16, a high-pressure gas tank 19, a back pressure valve 55, a gas tank 57 with a balance scale, a data acquisition instrument 60, a constant-temperature water bath 61 and a hydrate reservoir horizontal/vertical permeability measuring apparatus 62 provided in the constant-temperature water bath 61.

The cooling water/saturated methane water tank 3 is provided with a water circulation inlet 1 and an intake line 6 at an upper part and a water circulation outlet 2 at the bottom; the intake line 6 is provided thereon with an intake control gate valve 5; the bottom of the cooling water/saturated methane water tank 3, an outlet gate valve 7 of the cooling water/saturated methane tank and the water injection pump 8 are in communication.

The methane gas tank 11, a gas control valve 12, an inlet valve 13 of the gas booster pump and the booster pump 14 are in communication; the air compressor 16, an outlet valve 15 of the air compressor and the booster pump 14 are in communication; the booster pump 14, an outlet valve 17 of the booster pump, an inlet control valve 18 of the high-pressure gas tank and the high-pressure gas tank 19 are in communication.

The hydrate reservoir horizontal/vertical permeability measuring apparatus 62 is provided with a reactor main control valve 23 and a reactor outlet valve 53 on both ends; the reactor main control valve 23 is respectively in communication with a left side of the hydrate reservoir horizontal/vertical permeability measuring apparatus 62, and the bottom of the hydrate reservoir horizontal/vertical permeability measuring apparatus 62 through a vertical test inlet control valve 41; the reactor outlet valve 53 is in communication with a right side of the hydrate reservoir horizontal/vertical permeability measuring apparatus 62; the top of the hydrate reservoir horizontal/vertical permeability measuring apparatus 62 is in communication with a vertical differential pressure gauge outlet control valve 43 and a vertical outlet control valve 54; the vertical outlet control valve 54 is connected between the reactor outlet valve 53 and the back pressure valve 55.

The high-pressure gas tank 19, a gas tank pressure gauge 20, an outlet control valve 21 of the high-pressure gas tank are in communication; the water injection pump 8, a pump outlet gate valve 9 and a water control gate valve 10 are in communication; the water control gate valve 10 and the outlet control valve 21 of the high-pressure gas tank are in communication with a reactor inlet pressure gauge 22; the reactor inlet pressure gauge 22 is in communication with the reactor main control valve 23.

The reactor outlet valve 53, the back pressure valve 55, the gas tank control valve 56 and the gas tank 57 with the balance scale communicate in sequence; the gas tank 57 with the balance scale is provided thereon with an exhaust line 59; the exhaust line 59 is provided thereon with a gas flow meter 58.

The hydrate reservoir horizontal/vertical permeability measuring apparatus 62 is provided thereon with a P1 horizontal differential pressure gauge 27, a P2 horizontal differential pressure gauge 28, a P3 horizontal differential pressure gauge 29, a P4 vertical differential pressure gauge 47, a P5 vertical differential pressure gauge 48 and a P6 vertical differential pressure gauge 49.

The hydrate reservoir horizontal/vertical permeability measuring apparatus 62 is provided with a horizontal differential pressure gauge connection point I 33 and a horizontal differential pressure gauge connection point IV 39 on the left and right sides, a vertical differential pressure gauge connection points I 40 and a vertical differential pressure gauge connection point IV 38 on upper and lower ends, and a horizontal differential pressure gauge connection point II 34, a horizontal differential pressure gauge connection point III 37, a vertical differential pressure gauge connection point II 35 and a vertical differential pressure gauge connection point III 36 inside.

One end of the P1 horizontal differential pressure gauge 27 is connected to an inlet control valve 24 of a differential pressure gauge 1 and the horizontal differential pressure gauge connection point I 33, and the other end is connected to an outlet control valve 32 of the differential pressure gauge 1 and the horizontal differential pressure gauge connection point II 34.

The P2 horizontal differential pressure gauge 28 is connected to an inlet control valve 25 of a differential pressure gauge 2, the inlet control valve 24 of the differential pressure gauge 1 and the horizontal differential pressure gauge connection point I 33, and the other end is connected to an outlet control valve 31 of the differential pressure gauge 2 and the horizontal differential pressure gauge connection point III 37.

One end of the P3 horizontal differential pressure gauge 29 is connected to an inlet control valve 26 of a differential pressure gauge 3, the inlet control valve 25 of the differential pressure gauge 2, the inlet control valve 24 of the differential pressure gauge 1 and the horizontal differential pressure gauge connection point I 33, and the other end is connected to an outlet control valve 30 of the differential pressure gauge 3 and the horizontal differential pressure gauge connection point IV 39.

One end of the P4 vertical differential pressure gauge 47 is connected to a vertical differential pressure inlet control valve 42 and the horizontal differential pressure gauge connection point I 40, and the other end is connected to an outlet control valve 52 of a differential pressure gauge 4 and the vertical differential pressure gauge connection point II 35.

One end of the P5 vertical differential pressure gauge 48 is connected to the vertical differential pressure inlet control valve 42 and the vertical differential pressure gauge connection point I 40, and the other end is connected to an outlet control valve 51 of a differential pressure gauge 5 and the vertical differential pressure gauge connection point III 36.

One end of the P6 vertical differential pressure gauge 49 is connected to the vertical differential pressure inlet control valve 42 and the vertical differential pressure gauge connection point I 40, and the other end is connected to an outlet control valve 50 of a differential pressure gauge 6 and the vertical differential pressure gauge connection point IV 38.

The data acquisition instrument 60 is electrically connected to the P1 horizontal differential pressure gauge 27, the P2 horizontal differential pressure gauge 28, the P3 horizontal differential pressure gauge 29, the P4 vertical differential pressure gauge 47, the P5 vertical differential pressure gauge 48, the P6 vertical differential pressure gauge 49 and the gas flow meter 58.

Figure 2:
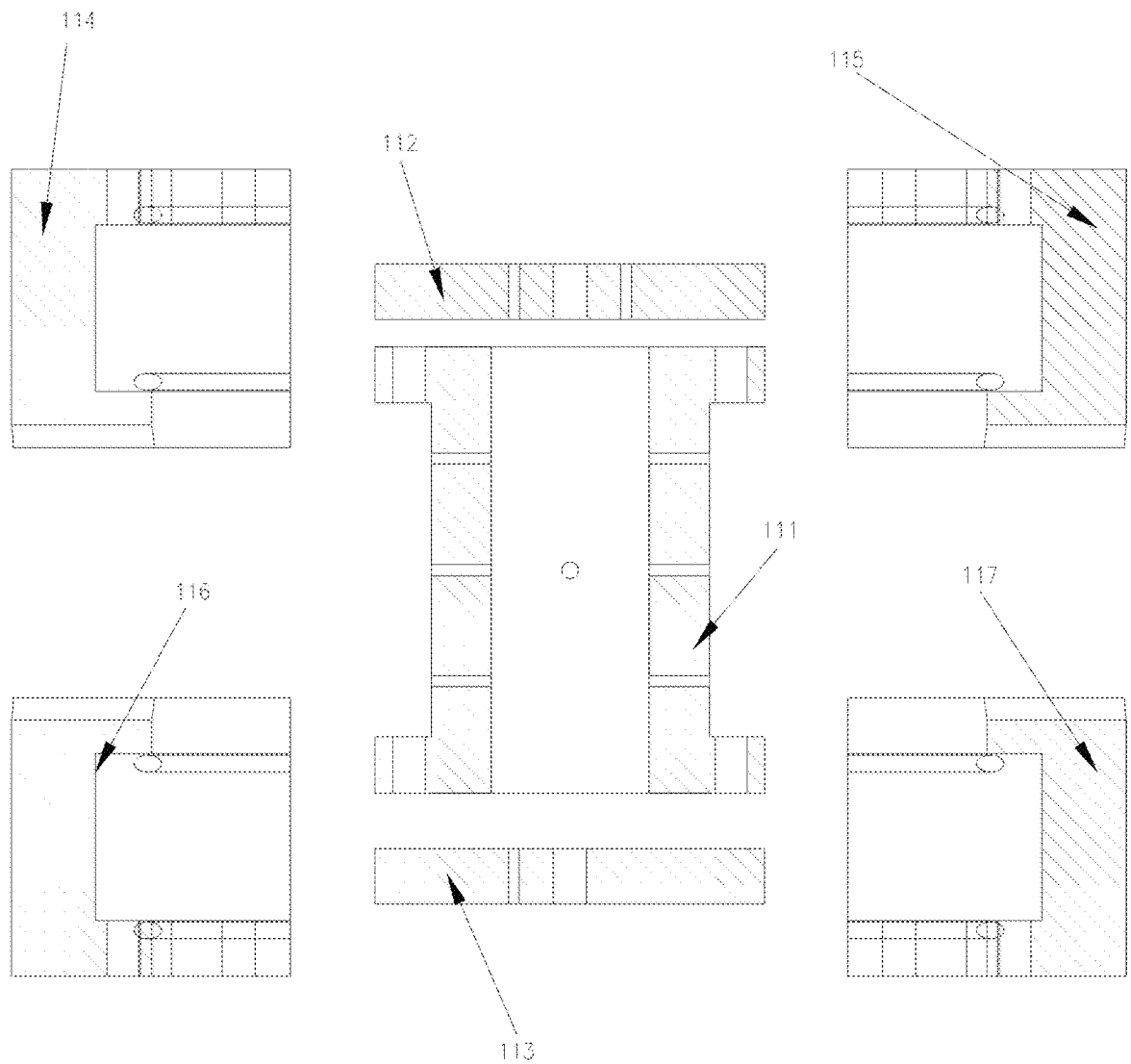
FIG. 2 is a structural diagram of a hydrate reservoir horizontal/vertical permeability measuring apparatus.
Figure 3:
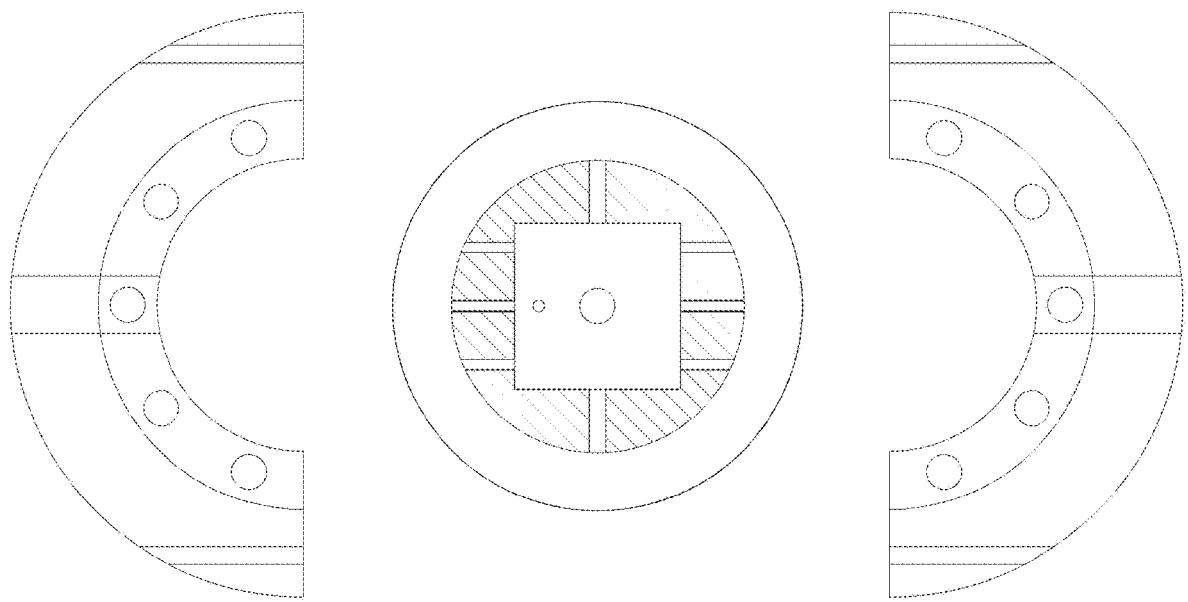
FIG. 3 is a bottom view of a hydrate reservoir horizontal/vertical permeability measuring apparatus.

As shown in FIGS. 2 and 3, the hydrate reservoir horizontal/vertical permeability measuring apparatus 62 includes a reaction vessel 111, an inlet cover 112, an outlet cover 113, an inlet left clamp 114, an inlet right clamp 115, an outlet left clamp 116 and an outlet right clamp 117; the inlet cover 112 is fixed to an upper end of the reaction vessel 111 through the inlet left clamp 114 and the inlet right clamp 115; the outlet cover 113 is fixed to a lower end of the reaction vessel 111 through the outlet left clamp 116 and the outlet right clamp 117.

An experimental process of the device includes:

1. Load a dried quantitative porous medium (such as quartz sand and glass sand) used for simulation into a reaction vessel 111.

2. Open the gas control valves 12, 13, 15, 17 and 18, and start the air compressor 16 and the booster pump 14 to inject a gas into the high-pressure gas tank 19 to a required gas pressure.

3. Inject the gas into the reaction vessel 111 to a certain pressure to check the tightness of the equipment to ensure that the equipment does not leak.

4. Adjust the temperature of the water bath 61 to a required temperature; start the cooling water/saturated methane water device 3, open the water circulation inlet 1 and the water circulation outlet 2, and start a gas inlet process 6, so that methane gas enters the device through a bubbler 4 and the methane gas dissolves in the water sufficiently to produce methane water; adjust the temperature to the same temperature as the water bath 61.

5. Open the gate valves 7, 9, 10, 23-26, 30, 31, 32, 41-46, 50-52, 53, 55 and 56, and close the gate valve 21.

6. Start the water injection pump 8 to inject water at a certain temperature into the reaction vessel 111 and a related process; discharge the air in the porous medium and a pipeline; adjust the back pressure valve 55 to 5 MPa until a liquid in the gas tank 57 with the balance scale has a constant flow rate, and a liquid volume is kept in balance with a discharge volume of the water injection pump 8.

7. Discharge the air from the differential pressure gauges 1-6 to ensure that the pipeline is filled with water.

8. Close the relevant gate valves (gate valves 41-46, 50-52, 54) of the vertical permeability test process, adjust the reaction vessel to a certain pressure, and monitor the data in real time by the pressure gauge 22 to keep a constant state.

9. Discharge a portion of the gas from the high-pressure gas tank 19 to displace water in the reaction vessel 111 to provide space for the gas, and adjust the reaction vessel to a certain pressure.

10. Start the water injection pump 8 to inject water into the reaction vessel 111 to a certain pressure (higher than an equilibrium pressure at the corresponding temperature), and stop the water injection pump 8.

11. Close the gate valves 23, 24 and 53 to allow a hydrate to be synthesized in the reaction vessel 111, and complete the hydrate formation after a period of time.

12. Adjust the back pressure valve 55 to a required pressure; open the valves 56, 23, 24 and 53, and start the water injection pump 8 to inject water into the reaction vessel 111 at a constant speed until the flow rate of the gas tank 57 with the balance scale remains constant; check the gas flow meter 58 to ensure that the hydrate is not decomposed, and obtain a change in different differential pressures of a hydrate sample in a horizontal direction.

13. After the test is completed, close the gate valves 24-26, 30-32 and 54, open the gate valves 41-46, 50-52 and 54, and start the water injection pump 8 to inject water into the reaction vessel 62 at the same speed as the horizontal permeability measurement process until the flow rate of the gas tank 57 with the balance scale remains constant; check the gas flow meter 58 to ensure that the hydrate is not decomposed, and obtain a change in different differential pressures of the hydrate sample in a vertical direction.

14. Record the relevant data of the entire hydrate formation process and the testing process with the data acquisition system 60.

15. Process the relevant data based on Darcy's Law to obtain a change in the horizontal/vertical permeability.

The above described are not intended to limit the present invention in any form. Although the present invention has been disclosed by the foregoing examples, the examples are not intended to limit the present invention. Any person skilled in the art may make some changes or modifications to implement equivalent examples with equivalent changes by using the technical contents disclosed above without departing from the scope of the technical solution of the present invention. Any simple modification, equivalent change and modification made to the foregoing examples according to the technical essence of the present invention without departing from the content of the technical solution of the present invention shall fall within the scope of the technical solution of the present invention.

What is claimed is:

1. A device for measuring a horizontal/vertical permeability of a hydrate reservoir, comprising a cooling water/saturated methane water tank, a water injection pump, a methane gas tank, a booster pump, an air compressor, a high-pressure gas tank, a back pressure valve, a gas tank with a balance scale, a data acquisition instrument, a constant-temperature water bath and a hydrate reservoir horizontal/vertical permeability measuring apparatus provided in the constant-temperature water bath, wherein the cooling water/saturated methane water tank comprises a water circulation inlet and an intake line at an upper part of the cooling water/saturated methane water tank and a water circulation outlet at a bottom of the cooling water/saturated methane water tank; the intake line is provided thereon with an intake control gate valve; the bottom of the cooling water/saturated methane water tank is in communication with the water injection pump;

the methane gas tank and the air compressor are in communication with the booster pump, and the booster pump is in communication with the high-pressure gas tank;

the water injection pump and the high-pressure gas tank are both in communication with an inlet of the hydrate reservoir horizontal/vertical permeability measuring apparatus; an outlet of the hydrate reservoir horizontal/vertical permeability measuring apparatus, the back pressure valve and the gas tank with the balance scale communicate in sequence; the gas tank with the balance scale is provided thereon with an exhaust line; the exhaust line is provided thereon with a gas flow meter;

the hydrate reservoir horizontal/vertical permeability measuring apparatus is provided thereon with a P1 horizontal differential pressure gauge, a P2 horizontal differential pressure gauge, a P3 horizontal differential pressure gauge, a P4 vertical differential pressure gauge, a P5 vertical differential pressure gauge and a P6 vertical differential pressure gauge;

the data acquisition instrument is electrically connected to the P1 horizontal differential pressure gauge, the P2 horizontal differential pressure gauge, the P3 horizontal differential pressure gauge, the P4 vertical differential pressure gauge, the P5 vertical differential pressure gauge, the P6 vertical differential pressure gauge and the gas flow meter;

the inlet of the hydrate reservoir horizontal/vertical permeability measuring apparatus comprises a left inlet and a bottom inlet; the outlet of the hydrate reservoir horizontal/vertical permeability measuring apparatus comprises a top outlet and a right outlet.

2. The device for measuring a horizontal/vertical permeability of a hydrate reservoir according to claim 1, wherein the hydrate reservoir horizontal/vertical permeability measuring apparatus comprises a reaction vessel, an inlet cover, an outlet cover, an inlet left clamp, an inlet right clamp, an outlet left clamp and an outlet right clamp; the inlet cover is fixed to an upper end of the reaction vessel through the inlet left clamp and the inlet right clamp; the outlet cover is fixed to a lower end of the reaction vessel through the outlet left clamp and the outlet right clamp.

3. The device for measuring a horizontal/vertical permeability of a hydrate reservoir according to claim 1, wherein the intake line is further provided thereon with a pressure gauge.

4. The device for measuring a horizontal/vertical permeability of a hydrate reservoir according to claim 1, wherein the gas tank with the balance scale is provided with a balance scale on a bottom of the gas tank with the balance scale.

5. The device for measuring a horizontal/vertical permeability of a hydrate reservoir according to claim 1, wherein the cooling water/saturated methane water tank is provided therein with a bubbler.

6. The device for measuring a horizontal/vertical permeability of a hydrate reservoir according to claim 1, wherein the high-pressure gas tank is provided thereon with a gas tank pressure gauge; the inlet of the hydrate reservoir horizontal/vertical permeability measuring apparatus is provided with a reactor inlet pressure gauge.

7. A method for measuring a horizontal/vertical permeability of a hydrate reservoir, comprising the following steps:

(1) loading a dried quantitative porous medium used for simulation into a hydrate reservoir horizontal/vertical permeability measuring apparatus;

(2) starting an air compressor and a booster pump to inject a gas into a high-pressure gas tank to a required gas pressure;

(3) injecting the gas from the high-pressure gas tank into the hydrate reservoir horizontal/vertical permeability measuring apparatus to a certain pressure to check tightness of the hydrate reservoir horizontal/vertical permeability measuring apparatus to ensure that the hydrate reservoir horizontal/vertical permeability measuring apparatus does not leak; then stopping the injection of the gas;

(4) adjusting a temperature of a constant-temperature water bath surrounding the hydrate reservoir horizontal/vertical permeability measuring apparatus to a required temperature; opening a water circulation inlet and a water circulation outlet to allow water entering a cooling water/saturated methane water tank; opening an intake line of the cooling water/saturated methane water tank to allow methane gas entering the cooling water/saturated methane water tank through a bubbler so that the methane gas dissolves in the water sufficiently to produce methane water; adjusting a temperature of the methane water to the same temperature as the temperature of the constant-temperature water bath;

(5) starting a water injection pump to inject the methane water into the hydrate reservoir horizontal/vertical permeability measuring apparatus and a related process; purging any air from the porous medium and a pipeline; adjusting a back pressure valve downstream of the hydrate reservoir horizontal/vertical permeability measuring apparatus to 5 MPa until a liquid in a gas tank with a balance scale has a constant flow rate and a liquid volume thereof is kept in balance with an injection volume from the water injection pump;

(6) purging any air from a P1 horizontal differential pressure gauge, a P2 horizontal differential pressure gauge, a P3 horizontal differential pressure gauge, a P4 vertical differential pressure gauge, a P5 vertical differential pressure gauge and a P6 vertical differential pressure gauge to ensure that the pipeline is filled with the methane water;

(7) adjusting a reaction vessel of the hydrate reservoir horizontal/vertical permeability measuring apparatus to a certain pressure, and monitoring data in real time by a reactor inlet pressure gauge, so as to keep a constant state; closing relevant gate valves to all the vertical differential pressure gauges; adjusting the reaction vessel to a certain pressure by monitoring pressure data in real time from the pressure gauge; then stopping the water injection pump;

(8) injecting a portion of the gas from the high-pressure gas tank to displace the methane water in the hydrate reservoir horizontal/vertical permeability measuring apparatus having the reaction vessel, and adjusting the reaction vessel to a certain pressure;

(9) starting the water injection pump again to inject the methane water from the cooling water/saturated methane water tank through the bubbler into the hydrate reservoir horizontal/vertical permeability measuring apparatus to a certain pressure, then again stopping the water injection pump;

(10) allowing a hydrate to be synthesized to form a hydrate sample in the hydrate reservoir horizontal/vertical permeability measuring apparatus, and allowing completing a hydrate formation process after a period of time by isolating the reaction vessel with closed relevant gate valves;

(11) adjusting the back pressure valve downstream of the hydrate reservoir horizontal/vertical permeability measuring apparatus to a required pressure; then opening the closed relevant gate valves; then, in a horizontal permeability test process, keeping the relevant gate valves closed to all the vertical differential pressure gauges, starting the water injection pump to inject the methane water into the hydrate reservoir horizontal/vertical permeability measuring apparatus at a constant speed until a first flow rate through the gas tank with the balance scale remains constant; checking a gas flow meter to ensure that the hydrate sample is not decomposed, and obtaining a change in different differential pressures of the hydrate sample in a horizontal direction to complete the horizontal permeability test process by obtaining the P1 horizontal differential pressure gauge, the P2 horizontal differential pressure gauge, and the P3 horizontal differential pressure gauge;

(12) in a vertical permeability test process, after the horizontal permeability test process is completed, closing relevant gate valves to all the horizontal differential pressure gauges and opening the gate valves to all the vertical differential pressure gauges, starting the water injection pump to inject the methane water from the cooling water/saturated methane water tank through the bubbler into the hydrate reservoir horizontal/vertical permeability measuring apparatus at the same constant speed as in the horizontal permeability test process until a second flow rate through the gas tank with the balance scale remains constant; checking the gas flow meter to ensure that the hydrate sample is not decomposed, and obtaining a change in different differential pressures of the hydrate sample in a vertical direction by obtaining the P4 vertical differential pressure gauge, the P5 vertical differential pressure gauge and the P6 vertical differential pressure gauge;

(13) recording relevant data of the hydrate formation process and the horizontal and vertical permeability test processes with a data acquisition instrument; and

(14) processing the relevant data based on Darcy's Law to obtain a change in the horizontal/vertical permeability.

* * * * *